United States Patent
Zhao et al.

(10) Patent No.: US 11,985,351 B2
(45) Date of Patent: *May 14, 2024

(54) FAST METHOD FOR IMPLEMENTING DISCRETE SINE TRANSFORM TYPE VII (DST 7)

(71) Applicant: TENCENT AMERICA LLC, Palo Alto, CA (US)

(72) Inventors: Xin Zhao, San Diego, CA (US); Xiang Li, San Diego, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/891,741

(22) Filed: Aug. 19, 2022

(65) Prior Publication Data
US 2022/0394297 A1    Dec. 8, 2022

Related U.S. Application Data

(63) Continuation of application No. 17/082,772, filed on Oct. 28, 2020, now Pat. No. 11,463,730, which is a continuation of application No. 16/549,463, filed on Aug. 23, 2019, now Pat. No. 10,841,616, which is a
(Continued)

(51) Int. Cl.
*H04N 19/18*    (2014.01)
*H04N 19/176*   (2014.01)
*H04N 19/44*    (2014.01)
*H04N 19/60*    (2014.01)

(52) U.S. Cl.
CPC ........... *H04N 19/60* (2014.11); *H04N 19/176* (2014.11); *H04N 19/18* (2014.11); *H04N 19/44* (2014.11)

(58) Field of Classification Search
None
See application file for complete search history.

(56) References Cited

U.S. PATENT DOCUMENTS

| | | | |
|---|---|---|---|
| 10,855,997 B2 * | 12/2020 | Chiang | ............... H04N 19/176 |
| 2007/0200738 A1 | 8/2007 | Reznik et al. | |
| 2007/0271321 A1 | 11/2007 | Reznik et al. | |

(Continued)

FOREIGN PATENT DOCUMENTS

JP    7024106 B2    2/2022

OTHER PUBLICATIONS

Office Action dated Dec. 20, 2022 from the Japanese Patent Office in JP Application No. 2021-204133.
(Continued)

*Primary Examiner* — Mohammad J Rahman
(74) *Attorney, Agent, or Firm* — Sughrue Mion, PLLC

(57) ABSTRACT

A method and apparatus for decoding a video sequence using a discrete sine transform (DST) type-VII transform core includes generating a set of tuples of transform core elements associated with an n-point DST-VII transform core. A first sum of a first subset of transform core elements of a first tuple is equal to a second sum of a second subset of remaining transform core elements of the first tuple. The n-point DST-VII transform core is generated based on generating the set of tuples of transform core elements. A transform on a block is performed using the n-point DST-VII transform core.

20 Claims, 6 Drawing Sheets

Related U.S. Application Data continuation of application No. 16/218,076, filed on Dec. 12, 2018, now Pat. No. 10,462,486.

(60) Provisional application No. 62/668,065, filed on May 7, 2018.

(56) References Cited

U.S. PATENT DOCUMENTS

| | | |
|---|---|---|
| 2012/0177102 A1 | 7/2012 | Bjøntegaard et al. |
| 2012/0307893 A1 | 12/2012 | Reznik et al. |
| 2013/0003856 A1 | 1/2013 | Saxena et al. |
| 2013/0114730 A1 | 5/2013 | Joshi et al. |
| 2014/0010284 A1 | 1/2014 | Hong et al. |
| 2014/0037012 A1 | 2/2014 | Bjøntegaard et al. |
| 2014/0056361 A1 | 8/2014 | Karczewicz et al. |
| 2015/0373373 A1 | 12/2015 | Wang |
| 2017/0150186 A1 | 5/2017 | Zhang et al. |
| 2017/0272782 A1 | 9/2017 | Li et al. |
| 2017/0324983 A1 | 11/2017 | Fenney |
| 2018/0048889 A1* | 2/2018 | Zhang ............... H04N 19/159 |
| 2018/0063553 A1* | 3/2018 | Zhang ............... H04N 19/11 |
| 2018/0098081 A1 | 4/2018 | Zhao et al. |
| 2018/0288739 A1 | 10/2018 | Cho et al. |
| 2018/0302631 A1* | 10/2018 | Chiang ............... H04N 19/176 |
| 2018/0359483 A1 | 12/2018 | Chen et al. |
| 2019/0014305 A1 | 1/2019 | Wang |
| 2019/0014350 A1 | 1/2019 | Wang |
| 2019/0191177 A1* | 6/2019 | He ............... H04N 19/517 |
| 2019/0342579 A1 | 11/2019 | Zhao et al. |

OTHER PUBLICATIONS

Batalla et al, Multiple transforms for video coding (Year: 2015).

Chivukula et al, Fast computing of discrete cosine and sine transforms of types VI and VII (Year: 2011).

The algebraic approach to the discrete cosine and sine transforms and their fast algorithms (Year: 2003).

Liu, et al., "Evaluations and suggestions for TU representation", Joint Collaborative Team on Video Coding (JCT-VC) of ITU-T SG16 WP3 and ISO/IEC JTC1/SC29/WG11, MediaTek USA, Mar. 2011 (7 pages).

Liu, et al., "Rectangular (2NxN and Nx2N) Intra Prediction", Joint Collaborative Team on Video Coding (JCT-VC) of ITU-T SG16 WP3 and ISO/IEC JTC1/SC29/WG11, MediaTek USA Inc., Nov. 2011 (6 pages).

Communication dated Apr. 30, 2021 from the European Patent Office in EP Application No. 19800836.9.

Communication issued Aug. 17, 2021 by the Japanese Patent Office in application No. 2020-545577.

Extended European Search Report dated Apr. 12, 2021 from the European Patent Office in EP Application No. 19800836.9.

Fuldseth, et al., "Transform design for HEVC with 16 bit intermediate data representation", Joint Collaborative Team on Video Coding (JCT-VC) of ITU-T SG16 WP3 and ISO/IEC JTC1/SC29/WG11, Cisco Systems, Texas Instruments Inc., Mar. 2011 (16 pages).

He, et al., "AHG16 Unification of SDIP and NSQT", Joint Collaborative Team on Video Coding (JCT-VC) of ITU-T SG16 WP3 and ISO/IEC JTC1/SC29/WG11, Tsinghua, USTC, HiSilicon, Microsoft, Huawei, LG, Qualcomm, Sony, MediaTek, Feb. 2012 (9 pages).

Koo, et al., "Description of SDR video coding technology proposal by LG Electronics", Joint Video Experts Team (JVET) of ITU-T SG 16 WP 3 and ISO/IEC JTC 1/SC 29/WG 11, LG Electronics, Apr. 2018 (71 pages).

Liu, et al., "Rectangular Partitioning for Intra Prediction in Hevc", MediaTek USA Inc. (6 pages).

Park et al., "Fast Computation of Integer DCT-V, DCT-VIII, and DST-VII for Video Coding", IEEE Transactions on Image Processing, vol. 28, No. 12, Dec. 2019, pp. 5839-5851, XP011743550 (13 pages total).

Said, et al., Complexity Reduction for Adaptive Multiple Transforms (AMTs) using Adjustment Stages, Joint Video Experts Team (JVET) of ITU-T SG 16 WP 3 and ISO/IEC JTC 1/SC 29/WG 11, Qualcomm Incorporated, Apr. 2018 (15 pages).

Zhang et al., "CE6-related: Fast DST-7/DCT-8 with dual implementation support", 11 JVET Meeting; Ljubljana; (The Joint Video Exploration Team of ISO/I EC JTC1/SC29/WG11 and ITU-T SG.16), No. JVET-K0291, Jul. 13, 2018, XP030199657 (14 pages total).

Zhang et al., "CE6-related: Fast DST-7/DCT-8 with dual implementation support", 11 JVET Meeting; Ljubljana; The Joint Video Expert Team (JVET) of ITU-T SG 16 WP 3 and ISO/IEC JTC 1/SC 29/WG 11, No. JVET-K0291-v1, Jul. 13, 2018, XP030199656 (11 pages total).

Zhang et al., "Fast Adaptive Multiple Transform for Versatile Video Coding", 2019 Data Compression Conference (DCC), Mar. 26, 2019, pp. 63-72, XP033548505 (10 pages total).

Zhang et al., "Fast DST-VII/DCT-VIII With Dual Implementation Support for Versatile Video Coding", IEEE Transactions on Circuits and Systems for Video Technology, vol. 31, No. 1, Jan. 2021, pp. 355-371, XP011830163 (17 pages total).

Zhao et al., "CE6: Fast DST-7/DCT-8 with dual implementation support (Test 6.1.4)", Joint Video Experts Team (JVET) of ITU-T SG 16 WP 3 and ISO/IEC JTC 1/SC 29/VG11 12th Meeting: Macao, CN, Oct. 3-12, 2018, JVET-L0286rl, XP030194863 (11 pages total).

Reznik et al. Relationship between DC-II, DCT-VI, and DST-VII Transforms (Year: 2013).

\* cited by examiner

Computer System 600

FAST METHOD FOR IMPLEMENTING DISCRETE SINE TRANSFORM TYPE VII (DST 7)

CROSS-REFERENCE TO RELATED APPLICATION

This is a continuation of U.S. application Ser. No. 17/082,772 filed Oct. 28, 2020, which is a continuation application of U.S. patent application Ser. No. 16/549,463, filed Aug. 23, 2019, which is a continuation application of U.S. application Ser. No. 16/218,076, filed Dec. 12, 2018, which claims priority under 35 U.S.C. § 119 to U.S. application No. 62/668,065, filed on May 7, 2018, in the United States Patent & Trademark Office, the disclosures of which are incorporated herein by reference in their entireties.

FIELD

This disclosure is directed to the next-generation video coding technologies beyond High Efficiency Video Coding (HEVC), such as, for example, Versatile Video Coding (VVC). More specifically, the present disclosure is directed to a fast method for implementing discrete sine transform type VII (DST type 7).

BACKGROUND

ITU-T VCEG (Q6/16) and ISO/IEC MPEG (JTC 1/SC 29/WG 11) promulgated the H.265/HEVC (High Efficiency Video Coding) standard in 2013 (version 1), and provided updates in 2014 (version 2), 2015 (version 3), and 2016 (version 4). Since, the ITU has been studying the potential need for standardization of future video coding technology with a compression capability that significantly exceeds that of the HEVC standard (including its extensions).

In October 2017, the ITU issued the Joint Call for Proposals on Video Compression with Capability beyond HEVC (CfP) By Feb. 15, 2018, a total of 22 CfP responses on standard dynamic range (SDR), 12 CfP responses on high dynamic range (HDR), and 12 CfP responses on 360 video categories were submitted, respectively.

In April 2018, all received CfP responses were evaluated in the 122 MPEG/10$^{th}$ JVET (Joint Video Exploration Team—Joint Video Expert Team) meeting. With careful evaluation, JVET formally launched the standardization of next-generation video coding beyond HEVC, i.e., the so-called Versatile Video Coding (VVC). The current version of which is VTM (VVC Test Model), i.e., VTM 1.

As compared to DCT-2, of which the fast methods have been extensively studied, the implementation of DST-7 is still much less efficient than DCT-2. For example, VTM 1 includes matrix multiplication.

In JVET-J0066, a method is proposed to approximate different types of DCTs and DSTs in JEM7 by applying adjustment stages to a transform in the DCT-2 family, which includes DCT-2, DCT-3, DST-2 and DST-3, and the adjustment stage refers to a matrix multiplication using a sparse matrix which requires relatively less operation counts.

In JVET-J001, a method for implementing n-point DST-7 using 2n+1 point Discrete Fourier Transform (DFT) is proposed.

SUMMARY

According to an aspect of the disclosure, a method for decoding a video sequence using a discrete sine transform (DST) type-VII transform core includes generating a set of tuples of transform core elements associated with an n-point DST-VII transform core, wherein a first sum of a first subset of transform core elements of a first tuple is equal to a second sum of a second subset of remaining transform core elements of the first tuple; generating the n-point DST-VII transform core based on generating the set of tuples of transform core elements; and performing a transform on a block using the n-point DST-VII transform core.

According to an aspect of the disclosure, a device for decoding a video sequence using a discrete sine transform (DST) type-VII transform core includes at least one memory configured to store program code; at least one processor configured to read the program code and operate as instructed by the program code, the program code including: generating code configured to cause the at least one processor to generate a set of tuples of transform core elements associated with an n-point DST-VII transform core, wherein a first sum of a first subset of transform core elements of a first tuple is equal to a second sum of a second subset of remaining transform core elements of the first tuple, and wherein the generating code is further configured to cause the at least one processor to generate the n-point DST-VII transform core based on generating the set of tuples of transform core elements; and performing code configured to cause the at least one processor to perform a transform on a block using the n-point DST-VII transform core.

According to an aspect of the disclosure, a non-transitory computer-readable medium storing instructions, the instructions comprising: one or more instructions that, when executed by one or more processors of a device, cause the one or more processors to: generate a set of tuples of transform core elements associated with an n-point DST-VII transform core, wherein a first sum of a first subset of transform core elements of a first tuple is equal to a second sum of a second subset of remaining transform core elements of the first tuple; generate the n-point DST-VII transform core based on generating the set of tuples of transform core elements; and perform a transform on a block using the n-point DST-VII transform core.

BRIEF DESCRIPTION OF THE DRAWINGS

Further features, the nature, and various advantages of the disclosed subject matter will be more apparent from the following detailed description and the accompanying, drawings in which.

PROBLEM TO BE SOLVED

Figure 1:
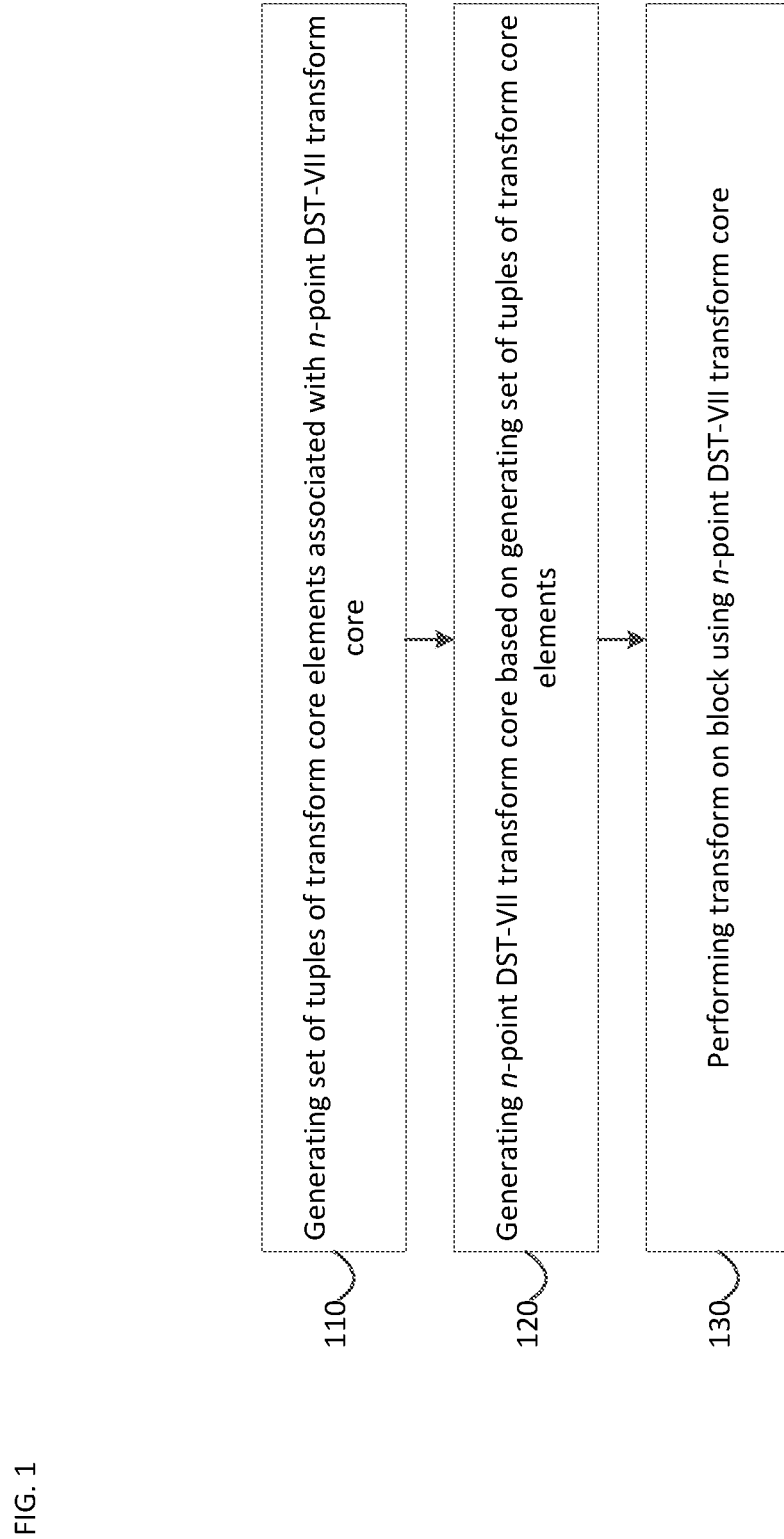
FIG. 1 is a flowchart of an example process for method for decoding a video sequence using a discrete sine transform (DST) type-VII transform core.

The lack of efficient fast implementation of DST-7 limits the application of DST-7 for practical video codec implementations.

For different implementation scenarios, a matrix multiplication based implementation is preferred since it includes more regular processing, but in some cases, a fast method which significantly reduces the number of operation counts is preferred. Therefore, it is highly desirable to identify a fast method which outputs substantially identical results as compared to a matrix multiplication based implementation, like the DCT-2 design in HEVC, which supports both matrix multiplication and a partial butterfly implementation.

The existing fast methods for DST-7, e.g., WET-J0066 and JVET-I0017, cannot support all the desirable features of a transform design in a video codec, including 16-bit intermediate operations, integer operations, and/or provide identical results between a fast method implementation and a matrix multiplication based implementation.

DETAILED DESCRIPTION

The present disclosure permits substantially similar results as compared to matrix multiplication based implementations based on the utilization of individual features/patterns in the transform bases of DST-7. In this way, some implementations herein conserve encoder and/or decoder computation resources, and improve efficiency.

As follows, a 16-point DST-7 integer transform core used in the forward transform can be represented as: {a, b, c, d, e, f, g, h, i, j, k, l, m, n, o, p}={8, 17, 25, 33, 41, 48, 55, 62, 67, 73, 77, 81, 84, 87, 88, 89}.

As shown above, the element values of a DST-7 transform core include the following characteristics a+j=l, b+i=m, c+h=d+g=o; and e+f=p.

According to an embodiment, an input vector for a 16-point transform is x={x0, x1, x2, ... , x15}, and the output transform coefficient vector is y={y0, y1, y2, ... , y15}.

Based on the above relationship between transform core elements, instead of implementing a·x0+j·x9+l·x11, which requires 3 multiplication operations, an embodiment implements: a·(x0+x11)+j·(x9+x11), which requires 2 multiplication operations.

In this way, to calculate y0, instead of performing the following vector-by-vector multiplication: y0=a·x0+b·x1+c·x2+d·x3+e·x4+f·x5+g·x6+h·x7+x·8+j·x9+k·x10+l·x11+m·x12+n·x13+o·x14+p·x15, which requires 16 multiplication operations, an embodiment performs the following operations to derive substantially similar results: y0=a·(x0+x·11)+b·(x·1+x12)+c·(x2+x13)+d·(x3+x14)+e·(x4+x15)+f·(x5+x15)+g·(x6+x14)+h·(x7+x13)+i·(x8+x12)+j·(x9+x11)+k·x10, which requires 11 multiplication operations.

Further, when calculating y2, y3, y6, y8, y9, y11, y12, y14, y15, similar implementations can be performed, and the intermediate results of (x0+x11), (x1+x12), (x2+x13), (x3+x14), (x4x15), (x5+x15), (x6+x14), (x7+x13), (x8+x12), (x9+x11) and k·x10 can be respectively re-used.

According to an embodiment, every third transform basis vector starting from the second basis vector includes some replicate patterns. For example, the second basis vector can be represented as:

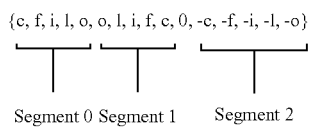

Segment 0  Segment 1  Segment 2

Further, the second basis vector can be divided into three segments as shown above (e.g., segment 0, segment 1, and segment 2). The three segments are replicates with sign changes, or in other words, "flipped" versions of each other. In this way, when calculating y1, instead of performing the following operations: y1=c·x0+f·x1+i·x2+l·x3+o·x4+o·x5+l·x6+i·x7+f·x8+c·x9−(c·x11+f·x12+i·x13+l·x14+o·x15), which requires 16 multiplication operations, an embodiment may perform the following operations while deriving substantially similar results: y0=c·(x0+x9−x11)+f·(x1+x8−x12)+i·(x2+x7−x13)+l·(x3+x6−x14)+o·(x4+x5−x15), which requires five multiplication operations.

Further, when calculating y1, y4, y7, y10, and y13, the calculations can be done in a similar way, and intermediate results of (x0+x9−x11), (x1+x8−x12), (x2+x7−x13), (x3+x6−x14) and (x4+x5−x15) can be re-used.

For the inverse transform, the transform core matrix is the transpose of the transform core matrix used for forward transforms, and the two features listed above are also applicable to inverse transforms. In addition, it is noted that, the $10^{th}$ basis vector is: {k, 0, −k, k, 0, −k, k, 0, −k, k, 0, −k, k, 0, −k, k}, which includes only a single unique absolute value (i.e., k). Therefore, instead of calculating y10 using vector-by-vector multiplication: y10=k·x0−k·x2+k·x3−k·x5+k·x6−k·x8+k·x9−k·x11+k·x12−k·x14+k·x15, which requires 11 multiplication operations, an embodiment may perform the following operations while deriving substantially similar results: y10=k·(x0−x2+x3−x5+x6−x8+x9−x11+x12−x14+x15), which requires a single multiplication operation.

For 64-point forward and backward DST-7, the above two features are also available, thus the similar fast methods discussed above are also applicable.

For 32-point forward and backward DST-7, the second feature is available, i.e., there are replicate or flipped segments in parts of basis vectors. Thus the similar fast methods discussed above based on the second feature are also applicable. The first feature is also available in 32-point forward and backward DST-7 transform cores, however, with different formulations as described below:

Elements of 32-point transform core contains 32 distinct numbers (without considering sign changes): {a, b, c, d, e, f, g, h, j, k, l, m, n, o, p, q, r, s, t, u, v, w, x, y, z, A, B, C, D, E, F}.

An example of a fixed point assignment of the elements is: {a, b, c, d, e, f, g, h, i, j, k, l, m, n, o, p, q, r, s, t, u, v, w, x, y, z, A, B, C, D, E, F}={4, 9, 13, 17, 21, 26, 30, 34, 38, 42, 46, 49, 53, 56, 60, 63, 66, 69, 71, 74, 76, 78, 81, 82, 84, 85, 87, 88, 89, 89, 90, 90}.

It is noted that the element values of a 32-point floating-point DST-7 transform core have the following characteristics: #0: a+l+A=n+y; #1: b+k+B=o+x; #2: c+j+C=p+w; #3: d+i+D=q+v; #4: e+h+E=r+u; and #5: f+g+F=s+t.

The involved elements in each of the above 6 equations construct a quintuple, e.g., {a, l, A, n, y} is quintuple #0, and {b, k, B, o, x} is another quintuple #1.

According to an embodiment, an input vector for a 32-point transform is x={x0, x1, x2, ... , x31}, and the output transform coefficient vector is y={y0, y1, y2, ... , y31}.

Based on the above relationship between transform core elements, instead of implementing a·x0+l·x11+n·x13+y·x24+A·x26, which requires 5 multiplication operations, an embodiment performs the following operations while deriving substantially similar results: a·x0+l·x11+n·x13+y·x24+(n+y−a−l)·x26, which can also be implemented as a·(x0− x26)+l·(x11−x26)+n·(x13+x26)+y·(x24+x26), which requires 4 multiplication operations.

Similarly, the above multiplication operations in reduced form are also applicable to other 5 quintuples, and the intermediate results, e.g., for quintuple #0, (x0−x26), (x11−x26), (x13+x26), (x24+x26) can be pre-calculated and re-used for calculating each of the transform coefficients.

However, it is noted that the integer value assignment of the elements {a, b, c, . . . , F} may not exactly follow the equations mentioned above due to rounding errors. For example, when {a, b, c, d, e, f, g, h, j, k, l, m, n, o, p, q, r, s, t, u, v, w, x, y, z, A, B, C, D, E, F}={4, 9, 13, 17, 21, 26, 30, 34, 38, 42, 46, 49, 53, 56, 60, 63, 66, 69, 71, 74, 76, 78, 81, 82, 84, 85, 87, 88, 89, 90, 90}, which is assigned by scaling using 64·$\sqrt{32}$ and rounding to the nearest integer.

For quintuple #1, b+k+B=9+46+88=143, whereas o+x=60+82=142.

Therefore, to achieve substantially similar results between matrix multiplication and a fast method, an embodiment adjusts the elements of each quintuple, in order to perform substantially similar to the equations defined elsewhere herein. For example, quintuple #1 is adjusted to be {b, k, o, x, B}={9, 46, 60, 82, 87}. Alternatively, quintuple #1 is adjusted to be {b, k, o, x, B}={9, 46, 60, 83, 88}. Alternatively, quintuple #1 is adjusted to be {b, k, o, x, B}={9, 46, 61, 82, 88}. Alternatively, quintuple #1 is adjusted to be {b, k, o, x, B}={9, 45, 60, 82, 88}. Alternatively, quintuple #1 is adjusted to be {b, k, o, x, B}={8, 46, 60, 82, 88}.

As compared to a matrix multiplication based implementation, which requires 256 multiplication operations and 256 addition/subtraction operations or WET-J0066 implementations, which require 152 multiplication operations and 170 addition/subtraction operations, some implementations herein permit 126 multiplication operations and 170 addition/subtraction operations, while providing substantially similar results. In this way, some implementations herein permit improved efficiency and conserve encoder and/or decoder computation resources.

FIG. 1 is a flowchart of an example process 100 for method for decoding a video sequence using a discrete sine transform (DST) type-VII transform core. In some implementations, one or more process blocks of FIG. 1 may be performed by a decoder. In some implementations, one or more process blocks of FIG. 1 may be performed by another device or a group of devices separate from or including a decoder, such as an encoder.

As shown in FIG. 1, process 100 may include generating a set of tuples of transform core elements associated with an n-point DST-VII transform core, wherein a first sum of a first subset of transform core elements of a first tuple is equal to a second sum of a second subset of remaining transform core elements of the first tuple (block 110).

As further shown in FIG. 1, process 100 may include generating the n-point DST-VII transform core based on generating the set of tuples of transform core elements (block 120).

As further shown in FIG. 1, process 100 may include performing a transform on a block using the n-point DST-VII transform core.

According to an embodiment, the distinct absolute element values existing in one transform core, together with some pre-defined constant numbers, can be divided into multiple tuples, and for each tuple, the sum of part of the absolute element values is identical to the sum of remaining absolute element values in the same tuple.

For example, in an embodiment, In one embodiment, the tuple is a triple which include 3 elements, and the sum of absolute values of 2 elements is identical to the absolute value of the remaining 1 element. Alternatively, the tuple is a quadruple which include 4 elements, and the sum of absolute values of 2 elements is identical to the sum of absolute value of the remaining 2 elements. Alternatively, the tuple is a quadruple which include 4 elements, and the sum of absolute values of 3 elements is identical to the sum of absolute value of the remaining 1 element. Alternatively, the tuple is a quintuple which include 5 elements, and the sum of absolute values of 3 elements is identical to the sum of absolute value of the remaining 2 element.

According to an embodiment, in addition to the existing distinct absolute element values existing in one transform core, the pre-defined constants which are powers of 2 (e.g., 1, 2, 4, 8, 16, 32, 64, etc.) can be also considered as elements in the tuples.

According to an embodiment, the distinct absolute element values existing in 16-point and 64-point DST-7 transform cores are divided into multiple triples, each of which includes 3 elements. Additionally, or alternatively, the distinct absolute element values existing in a 32-point DST-7 transform core are divided into multiple quintuples, each of which includes 5 elements.

According to an embodiment, for an integer transform core, the integer elements of a transform core may be further tuned to exactly meet the feature as described above, i.e., the sum of absolute values of part of the elements in one tuple is identical to the sum of absolute values of the remaining elements in the same tuple while keeping good orthogonality of transform cores. For example, for a 32-point integer DST-7 core, the second tuple {b, k, o, x, B} is adjusted to be {9, 46, 60, 82, 87}. Alternatively, for a 32-point integer DST-7 core, the second tuple {b, k, o, x, B} is adjusted to be {9, 46, 60, 83, 88}. Alternatively, for 32-point integer DST-7 core, the second tuple {b, k, o, x, B} is adjusted to be {9, 46, 61, 82, 88}. Alternatively, for 32-point integer DST-7 core, the second tuple {b, k, o, x, B} is adjusted to be {9, 45, 60, 82, 88}. Alternatively, for a 32-point integer DST-7 core, the second tuple {b, k, o, x, B} is adjusted to be {8, 46, 60, 82, 88}. Alternatively, for a 32-point integer DST-7 core, the sixth tuple {f, g, s, t, B} is adjusted to be {26, 30, 71, 74, 89}. Alternatively, for a 32-point integer DST-7 core, the sixth tuple {b, k, o, x, B} is adjusted to be {26, 30, 71, 75, 90}. Alternatively, for a 32-point integer DST-7 core, the sixth tuple {b, k, o, x, B} is adjusted to be {26, 30, 72, 74, 90}. Alternatively, for a 32-point integer DST-7 core, the sixth tuple {b, k, o, x, B} is adjusted to be {26, 29, 71, 74, 90}. Alternatively, for a 32-point integer DST-7 core, the sixth tuple {b, k, o, x, B} is adjusted to be {25, 30, 71, 74, 90}.

According to an embodiment, the elements of transform cores can be further adjusted by only +1 or −1 on top of the element value derived by scaling with a pre-defined constant and rounding to the nearest integer.

According to an embodiment, the elements of transform cores can be further tuned by only +1, −1, +2 and −2 on top of the element value derived by scaling with a pre-defined constant and rounding to the nearest integer.

According to an embodiment, the orthogonality of the tuned transform core, denoted as A, is measured by the sum of absolute values of the matrix $A \cdot A^T - s \cdot I$, where s is the pre-defined scaling factor for deriving the integer transform core, and I is the identity matrix.

Although FIG. 1 shows example blocks of process 100, in some implementations, process 100 may include additional blocks, fewer blocks, different blocks, or differently arranged blocks than those depicted in FIG. 1. Additionally, or alternatively, two or more of the blocks of process 100 may be performed in parallel.

Figure 2:
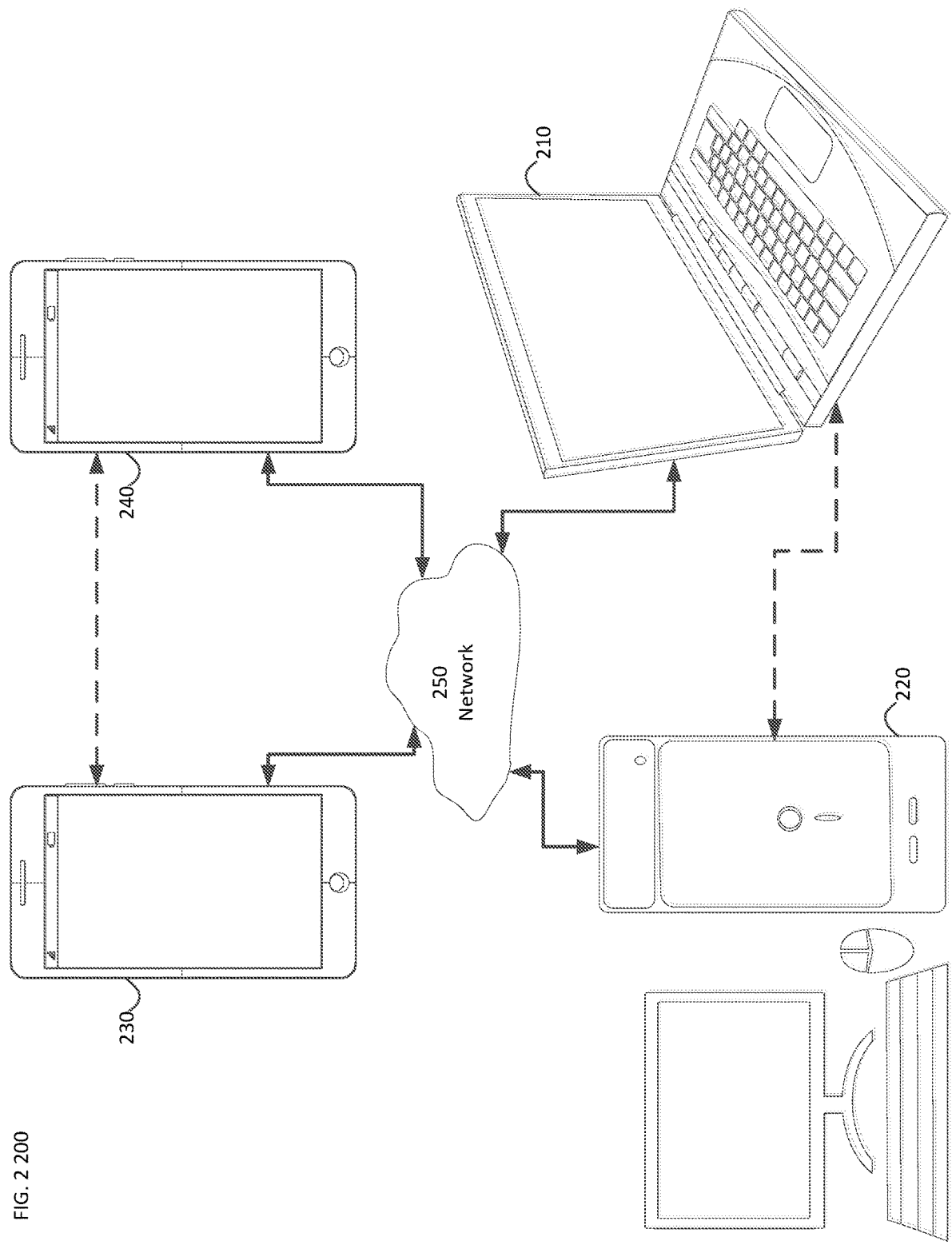
FIG. 2 is a simplified block diagram of a communication system according to an embodiment of the present disclosure.

FIG. 2 illustrates a simplified block diagram of a communication system (200) according to an embodiment of the present disclosure. The communication system (200) may include at least two terminals (210-220) interconnected via a network (250). For unidirectional transmission of data, a first terminal (210) may code video data at a local location for transmission to the other terminal (220) via the network (250). The second terminal (220) may receive the coded video data of the other terminal from the network (250), decode the coded data and display the recovered video data. Unidirectional data transmission may be common in media serving applications and the like.

FIG. 2 illustrates a second pair of terminals (230, 240) provided to support bidirectional transmission of coded video that may occur, for example, during videoconferencing. For bidirectional transmission of data, each terminal (230, 240) may code video data captured at a local location for transmission to the other terminal via the network (250). Each terminal (230, 240) also may receive the coded video data transmitted by the other terminal, may decode the coded data and may display the recovered video data at a local display device.

In FIG. 2, the terminals (210-240) may be illustrated as servers, personal computers and smart phones but the principles of the present disclosure are not so limited. Embodiments of the present disclosure find application with laptop computers, tablet computers, media players and/or dedicated video conferencing equipment. The network (250) represents any number of networks that convey coded video data among the terminals (210-240), including for example wireline and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
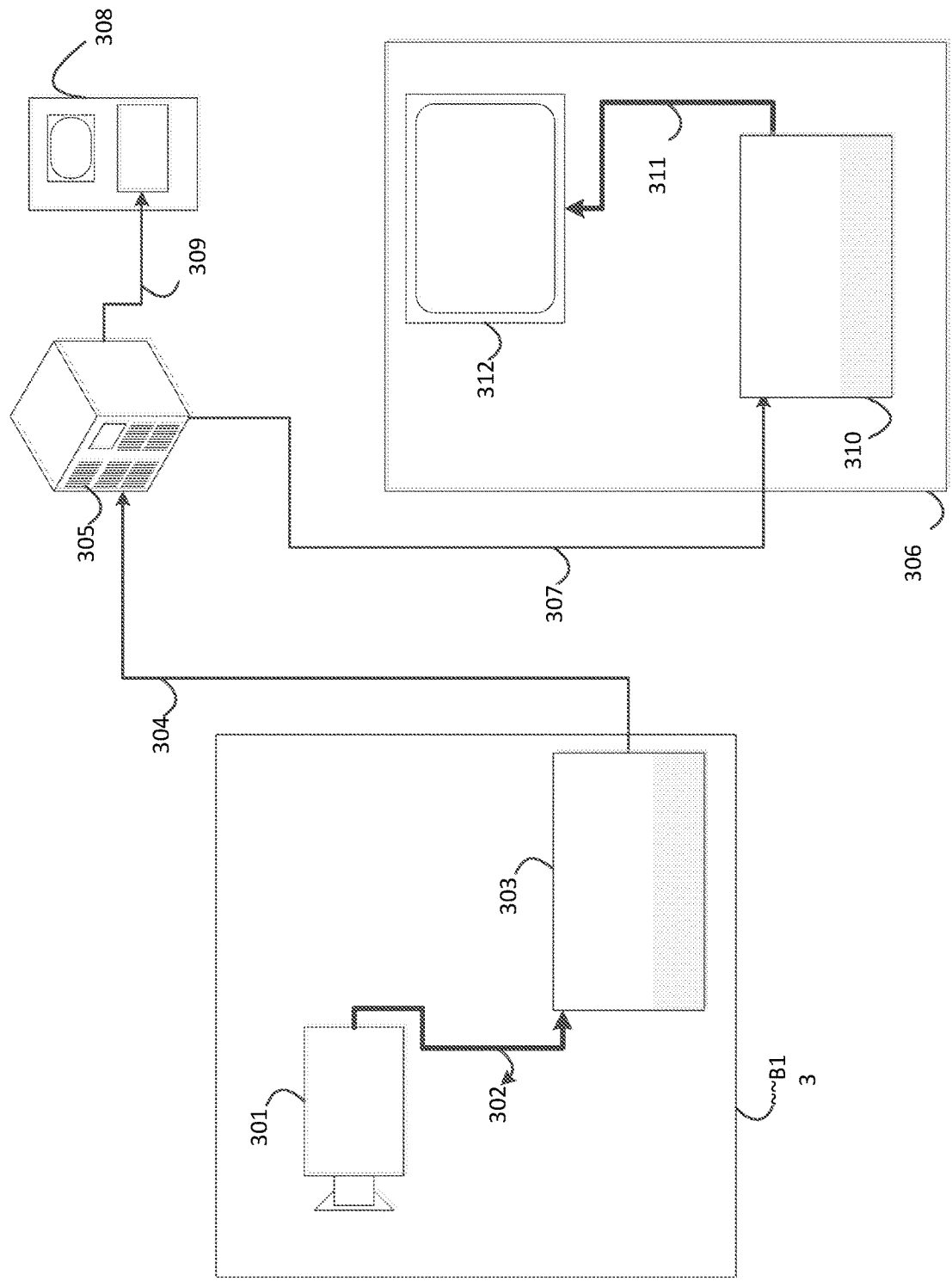
FIG. 3 is a diagram of the placement of a video encoder and decoder in a streaming environment.

FIG. 3 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating, for example, an uncompressed video sample stream (302). That sample stream (302), depicted as a bold line to emphasize a high data volume when compared to encoded video bitstreams, can be processed by an encoder (303) coupled to the camera 301). The encoder (303) can include hardware, software, or a combination thereof to enable or implement aspects of the disclosed subject matter as described in more detail below. The encoded video bitstream (304), depicted as a thin line to emphasize the lower data volume when compared to the sample stream, can be stored on a streaming server (305) for future use. One or more streaming clients (306, 308) can access the streaming server (305) to retrieve copies (307, 309) of the encoded video bitstream (304). A client (306) can include a video decoder (310) which decodes the incoming copy of the encoded video bitstream (307) and creates an outgoing video sample stream (311) that can be rendered on a display (312) or other rendering device (not depicted). In some streaming systems, the video bitstreams (304, 307, 309) can be encoded according to certain video coding/compression standards. Examples of those standards include ITU-T Recommendation H.265. Under development is a video coding standard informally known as Versatile Video Coding (VVC). The disclosed subject matter may be used in the context of VVC.

Figure 4:
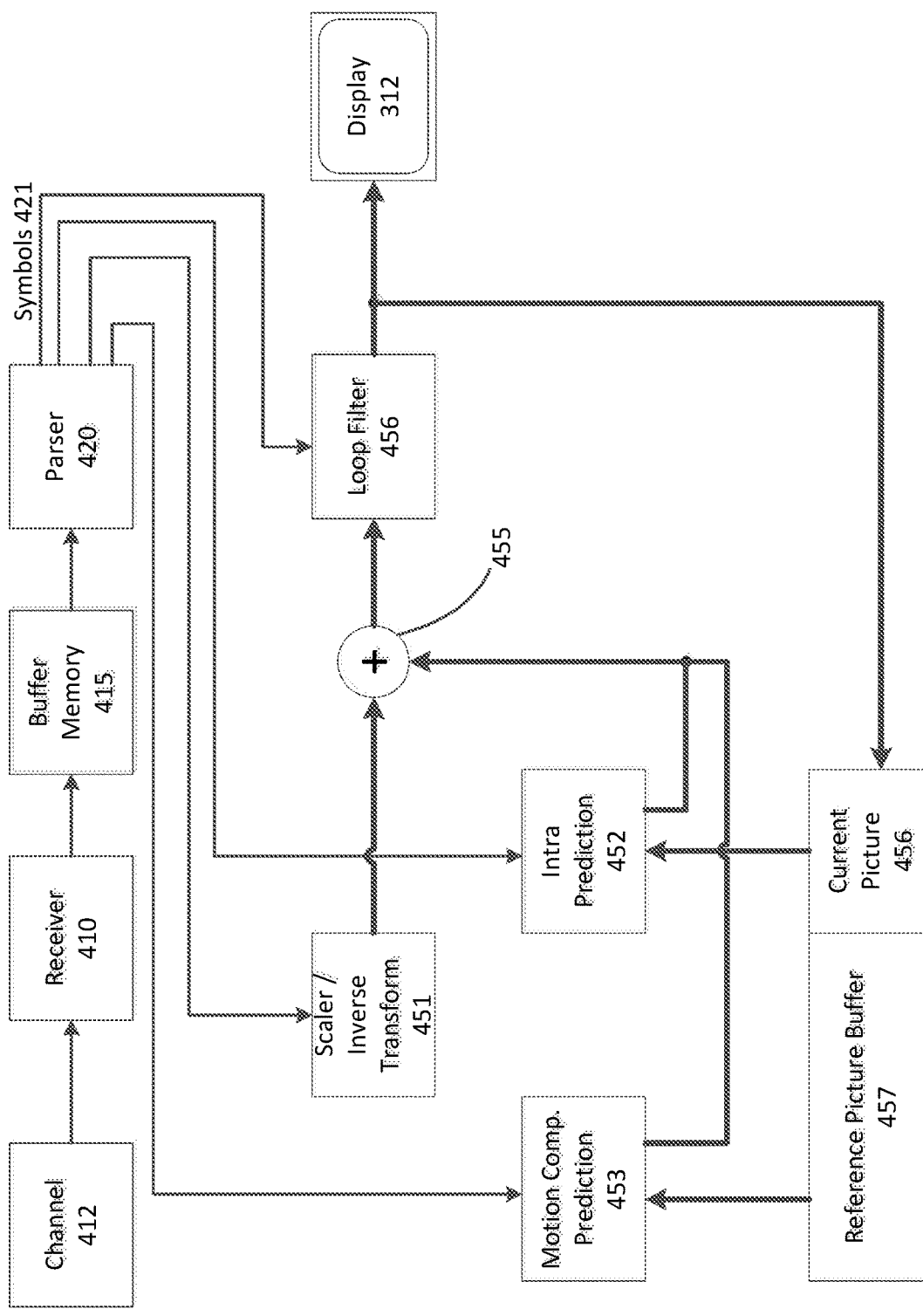
FIG. 4 is a functional block diagram of a video decoder according to an embodiment of the present disclosure.

FIG. 4 may be a functional block diagram of a video decoder (310) according to an embodiment of the present invention.

A receiver (410) may receive one or more codec video sequences to be decoded by the decoder (310); in the same or another embodiment, one coded video sequence at a time, where the decoding of each coded video sequence is independent from other coded video sequences. The coded video sequence may be received from a channel (412), which may be a hardware/software link to a storage device which stores the encoded video data. The receiver (410) may receive the encoded video data with other data, for example, coded audio data and/or ancillary data streams, that may be forwarded to their respective using entities (not depicted). The receiver (410) may separate the coded video sequence from the other data. To combat network jitter, a buffer memory (415) may be coupled in between receiver (410) and entropy decoder/parser (420) ("parser" henceforth). When receiver (410) is receiving data from a store/forward device of sufficient bandwidth and controllability, or from an isosynchronous network, the buffer (415) may not be needed, or can be small. For use on best effort packet networks such as the Internet, the buffer (415) may be required, can be comparatively large and can advantageously of adaptive size.

The video decoder (310) may include a parser (420) to reconstruct symbols (421) from the entropy coded video sequence. Categories of those symbols include information used to manage operation of the decoder (310), and potentially information to control a rendering device such as a display (312) that is not an integral part of the decoder but can be coupled to it, as was shown in FIG. 4. The control information for the rendering device(s) may be in the form of Supplementary Enhancement Information (SEI messages) or Video Usability Information (VUI) parameter set fragments (not depicted). The parser (420) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (420) may perform entropy decoding/parsing operation on the video sequence received from the buffer (415), so to create symbols (421). The parser (420) may receive encoded data, and selectively decode particular symbols (421). Further, the parser (420) may determine whether the particular symbols (421) are to be provided to a Motion Compensation Prediction unit (453), a scaler/inverse transform unit (451), an Intra Prediction Unit (452), or a loop filter (456).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives quantized transform coefficient as well as control information, including which transform to use, block size, quantization factor, quantization scaling matrices, etc. as symbol(s) (621) from the parser (420). It can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current (partly reconstructed) picture (456). The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a Motion Compensation Prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (421) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video bitstream and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (312) as well as stored in the reference picture memory (456) for use in future inter-picture prediction.

Certain coded pictures, once fully reconstructed, can be used as reference pictures for future prediction. Once a coded picture is fully reconstructed and the coded picture has been identified as a reference picture (by, for example, parser (420)), the current reference picture (656) can become part of the reference picture buffer (457), and a fresh current picture memory can be reallocated before commencing the reconstruction of the following coded picture.

The video decoder (310) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (410) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 5:
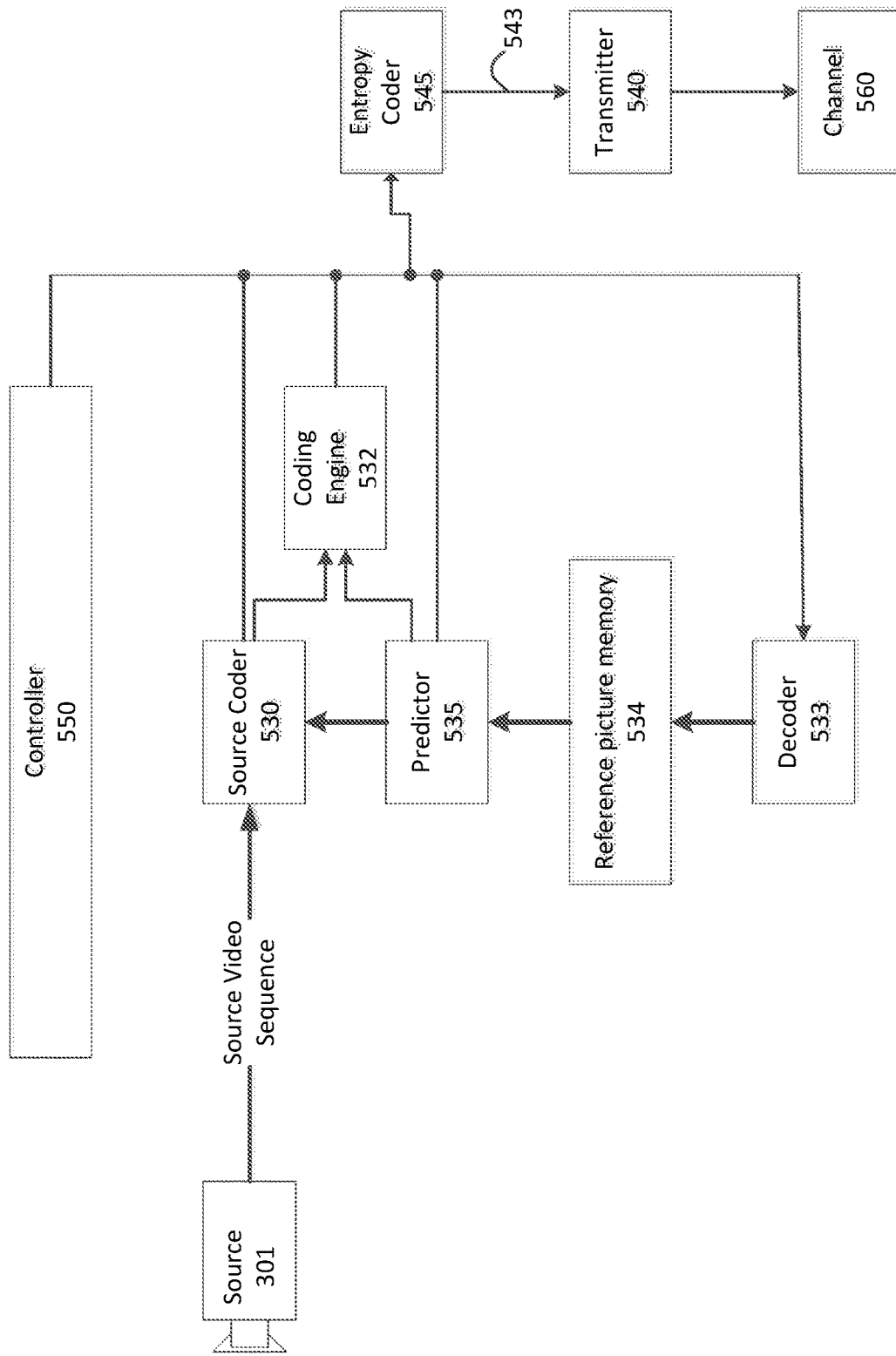
FIG. 5 is a functional block diagram of a video encoder according to an embodiment of the present disclosure.

FIG. 5 may be a functional block diagram of a video encoder (303) according to an embodiment of the present disclosure.

The encoder (303) may receive video samples from a video source (301) (that is not part of the encoder) that may capture video image(s) to be coded by the encoder (303).

The video source (301) may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (301) may be a storage device storing previously prepared video. In a videoconferencing system, the video source (303) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder (303) may code and compress the pictures of the source video sequence into a coded video sequence (543) in real time or under any other time constraints as required by the application. Enforcing appropriate coding speed is one function of Controller (550). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (550) as they may pertain to video encoder (303) optimized for a certain system design.

Some video encoders operate in what a person skilled in the art readily recognizes as a "coding loop." As an oversimplified description, a coding loop can consist of the encoding part of an encoder (530) ("source coder" henceforth) (responsible for creating symbols based on an input picture to be coded, and a reference picture(s)), and a (local) decoder (533) embedded in the encoder (303) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (534). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (533) can be the same as of a "remote" decoder (310), which has already been described in detail above in conjunction with FIG. 4. Briefly referring also to FIG. 5, however, as symbols are available and en/decoding of symbols to a coded video sequence by entropy coder (545) and parser (420) can be lossless, the entropy decoding parts of decoder (310), including channel (412), receiver (410), buffer (415), and parser (420) may not be fully implemented in local decoder (533).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (530) may perform motion compensated predictive coding, which codes an input frame predictively with reference to one or more previously-coded frames from the video sequence that were designated as "reference frames." In this manner, the coding engine (532) codes differences between pixel blocks of an input frame and pixel blocks of reference frame(s) that may be selected as prediction reference(s) to the input frame.

The local video decoder (533) may decode coded video data of frames that may be designated as reference frames, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference frames and may cause reconstructed reference frames to be stored in the reference picture cache (534). In this manner, the encoder (303) may store copies of reconstructed reference frames locally that have common content as the reconstructed reference frames that will be obtained by a far-end video decoder (absent transmission errors).

The predictor (535) may perform prediction searches for the coding engine (532). That is, for a new frame to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the video coder (530), including, for example, setting of parameters and subgroup parameters used for encoding the video data.

Output of all aforementioned functional units may be subjected to entropy coding in the entropy coder (545). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare it for transmission via a communication channel (560), which may be a hardware/software link to a storage device which would store the encoded video data. The transmitter (540) may merge coded video data from the video coder (530) with other data to be transmitted, for example, coded audio data and/or ancillary data streams (sources not shown).

The controller (550) may manage operation of the encoder (303). During coding, the controller (550) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (303) may perform coding operations according to a predetermined video coding technology or standard, such as ITU-T Rec. H.265. In its operation, the video coder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The video coder (530) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above, can be implemented as computer software using computer-readable instructions and physically stored in one or more computer-readable media. For example, FIG. 6 shows a computer system 1200 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 6:
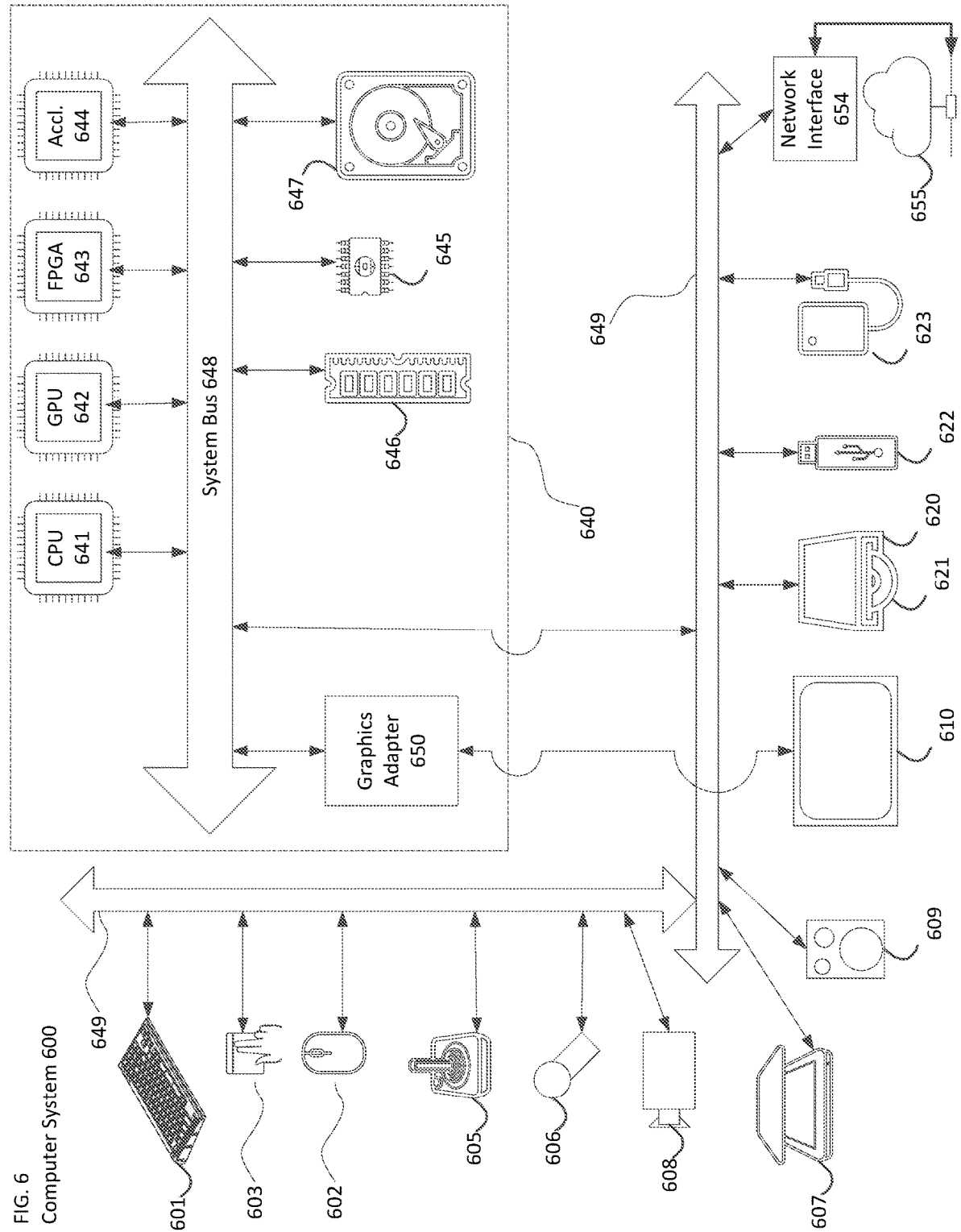
FIG. 6 is a diagram of a computer system in accordance with an embodiment.

The components shown in FIG. 6 for computer system 1200 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1200.

Computer system 1200 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 601, mouse 602, trackpad 603, touch screen 610, data-glove 1204, joystick 605, microphone 606, scanner 607, camera 608.

Computer system 1200 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 610, data-glove 1204, or joystick 605, but there can also be tactile feedback devices that do not serve as input devices), audio output devices (such as: speakers 609, headphones (not depicted)), visual output devices (such as screens 610 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1200 can also include human accessible storage devices and their associated media such as optical media including CD/DVD ROM/RW 620 with CD/DVD or the like media 621, thumb-drive 622, removable hard drive or solid state drive 623, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1200 can also include interface(s) to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (649) (such as, for example universal serial bus (USB) ports of the computer system 1200; others are commonly integrated into the core of the computer system 1200 by attachment to a system bus as described below (for example Ethernet interface into a PC computer system or cellular network interface into a smartphone computer system). Using any of these networks, computer system 1200 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 640 of the computer system 1200.

The core 640 can include one or more Central Processing Units (CPU) 641, Graphics Processing Units (GPU) 642, specialized programmable processing units in the form of Field Programmable Gate Areas (FPGA) 643, hardware accelerators for certain tasks 644, and so forth. These devices, along with Read-only memory (ROM) 645, Random-access memory (RAM) 646, internal mass storage such as internal non-user accessible hard drives, solid-state drives (SSDs), and the like 647, may be connected through a system bus 1248. In some computer systems, the system bus 1248 can be accessible in the form of one or more physical plugs to enable extensions by additional CPUs, GPU, and the like. The peripheral devices can be attached either directly to the core's system bus 1248, or through a peripheral bus 649. Architectures for a peripheral bus include peripheral component interconnect (PCI), USB, and the like.

CPUs 641, GPUs 642, FPGAs 643, and accelerators 644 can execute certain instructions that, in combination, can make up the aforementioned computer code. That computer code can be stored in ROM 645 or RAM 646. Transitional data can be also be stored in RAM 646, whereas permanent data can be stored for example, in the internal mass storage 647. Fast storage and retrieve to any of the memory devices can be enabled through the use of cache memory, that can be closely associated with one or more CPU 641, GPU 642, mass storage 647, ROM 645, RAM 646, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1200, and specifically the core 640 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 640 that are of non-transitory nature, such as core-internal mass storage 647 or ROM 645. The software implementing various embodiments of the present disclosure can be stored in such devices and executed by core 640. A computer-readable medium can include one or more memory devices or chips, according to particular needs. The software can cause the core 640 and specifically the processors therein (including CPU, GPU, FPGA, and the like) to execute particular processes or particular parts of particular processes described herein, including defining data structures stored in RAM 646 and modifying such data structures according to the processes defined by the software. In addition or as an alternative, the computer system can provide functionality as a result of logic hardwired or otherwise embodied in a circuit (for example: accelerator 644), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method for generating an n-point DST-VII transform core, the method comprising:
    generating a set of tuples of transform core elements associated with the n-point DST-VII transform core; and
    generating the n-point DST-VII transform core based on generating the set of tuples of transform core elements,
    wherein a first sum of a first subset of transform core elements of a first tuple is equal to a second sum of a second subset of remaining transform core elements of the first tuple,
    wherein the set of tuples include $\{a, l, A, n, y\}$, $\{b, k, B, o, x\}$, $\{c, j, C, p, w\}$, $\{d, I, D, q, v\}$, $\{e, h, E, r, u\}$, and $\{f, g, F, s, t\}$, and
    wherein $a+l+A=n+y$, $b+k+B=o+x$, $c+j+C=p+w$, $d+I+D=q+v$, $e+h+E=r+u$, and $f+g+F=s+t$.

2. The method of claim 1, wherein a 32-point DST-VII transform core is constructed using the elements included in the set of tuples and an element m and an element z.

3. The method of claim 1, wherein n is equal to sixteen or sixty-four, and wherein each tuple, of the set of tuples, includes three transform core elements.

4. The method of claim 1, wherein n is equal to thirty-two, and wherein each tuple, of the set of tuples, includes five transform core elements.

5. The method of claim 1, wherein a tuple, of the set of tuples, includes a first transform core element, a second transform core element, a third transform core element, and a fourth transform core element, and wherein a sum of absolute values of the first transform core element and the second transform core element is equal to a sum of absolute values of the third transform core element and the fourth transform core element.

6. The method of claim 1, wherein a tuple, of the set of tuples, includes a first transform core element, a second transform core element, a third transform core element, and a fourth transform core element, and wherein a sum of absolute values of the first transform core element, the second transform core element, and the third transform core element is equal to an absolute value of the fourth transform core element.

7. The method of claim 1, wherein a tuple, of the set of tuples, includes a first transform core element, a second transform core element, a third transform core element, a fourth transform core element, and a fifth transform core element, and wherein a sum of absolute values of first transform core element, the second transform core element, and the third transform core element is equal to a sum of the fourth transform core element and the fifth transform core element.

8. A device for generating an n-point DST-VII transform core, the device comprising:
   at least one memory configured to store program code;
   at least one processor configured to read the program code and operate as instructed by the program code, the program code including:
     generating code configured to cause the at least one processor to generate a set of tuples of transform core elements associated with the n-point DST-VII transform core, and generate the n-point DST-VII transform core based on generating the set of tuples of transform core elements
   wherein a first sum of a first subset of transform core elements of a first tuple is equal to a second sum of a second subset of remaining transform core elements of the first tuple,
   wherein the set of tuples include {a, l, A, n, y}, {b, k, B, o, x}, {c, j, C, p, w}, {d, I, D, q, v}, {e, h, E, r, u}, and {f, g, F, s, t}, and
   wherein a+l+A=n+y, b+k+B=o+x, c+j+C=p+w, d+I+D=q+v, e+h+E=r+u, and f+g+F=s+t.

9. The device of claim 8, wherein a 32-point DST-VII transform core is constructed using the elements included in the set of tuples and an element m and an element z.

10. The device of claim 8, wherein n is equal to sixteen or sixty-four, and wherein each tuple, of the set of tuples, includes three transform core elements.

11. The device of claim 8, wherein n is equal to sixteen or thirty-two, and wherein each tuple, of the set of tuples, includes five transform core elements.

12. The device of claim 8, wherein a tuple, of the set of tuples, includes a first transform core element, a second transform core element, a third transform core element, and a fourth transform core element, and wherein a sum of absolute values of the first transform core element and the second transform core element is equal to a sum of absolute values of the third transform core element and the fourth transform core element.

13. The device of claim 8, wherein a tuple, of the set of tuples, includes a first transform core element, a second transform core element, a third transform core element, and a fourth transform core element, and wherein a sum of absolute values of the first transform core element, the second transform core element, and the third transform core element is equal to an absolute value of the fourth transform core element.

14. A non-transitory computer-readable medium storing instructions, the instructions comprising: one or more instructions that, when executed by one or more processors of a device, cause the one or more processors to:
   generate a set of tuples of transform core elements associated with an n-point DST-VII transform core; and
   generate the n-point DST-VII transform core based on generating the set of tuples of transform core elements,
   wherein a first sum of a first subset of transform core elements of a first tuple is equal to a second sum of a second subset of remaining transform core elements of the first tuple,
   wherein the set of tuples include {a, l, A, n, y}, {b, k, B, o, x}, {c, j, C, p, w}, {d, I, D, q, v}, {e, h, E, r, u}, and {f, g, F, s, t}, and
   wherein a+l+A=n+y, b+k+B=o+x, c+j+C=p+w, d+I+D=q+v, e+h+E=r+u, and f+g+F=s+t.

15. The non-transitory computer-readable medium of claim 14, wherein a 32-point DST-VII transform core is constructed using the elements included in the set of tuples and an element m and an element z.

16. The non-transitory computer-readable medium of claim 14, wherein n is equal to sixteen or sixty-four, and wherein each tuple, of the set of tuples, includes three transform core elements.

17. The non-transitory computer-readable medium of claim 14, wherein n is equal to thirty-two, and wherein each tuple, of the set of tuples, includes five transform core elements.

18. The non-transitory computer-readable medium of claim 14, wherein a tuple, of the set of tuples, includes a first transform core element, a second transform core element, a third transform core element, and a fourth transform core element, and wherein a sum of absolute values of the first transform core element and the second transform core element is equal to a sum of absolute values of the third transform core element and the fourth transform core element.

19. The non-transitory computer-readable medium of claim 14, wherein a tuple, of the set of tuples, includes a first transform core element, a second transform core element, a third transform core element, and a fourth transform core element, and wherein a sum of absolute values of the first transform core element, the second transform core element, and the third transform core element is equal to an absolute value of the fourth transform core element.

20. The non-transitory computer-readable medium of claim 14, wherein a tuple, of the set of tuples, includes a first transform core element, a second transform core element, a third transform core element, a fourth transform core element, and a fifth transform core element, and wherein a sum of absolute values of first transform core element, the second transform core element, and the third transform core element is equal to a sum of the fourth transform core element and the fifth transform core element.

* * * * *

UNITED STATES PATENT AND TRADEMARK OFFICE
CERTIFICATE OF CORRECTION

PATENT NO. : 11,985,351 B2
APPLICATION NO. : 17/891741
DATED : May 14, 2024
INVENTOR(S) : Xin Zhao, Xiang Li and Shan Liu Page 1 of 1

It is certified that error appears in the above-identified patent and that said Letters Patent is hereby corrected as shown below:

In the Claims

In Claim 1, Column 16, Line 4, replace "{d, I, D, q, v}" with "{d, i, D, q, v}".

In Claim 1, Column 16, Lines 44 and 45, replace "d+I+D=q+v" with "d+i+D=q+v".

In Claim 8, Column 17, Line 30, replace "{d, I, D, q, v}" with "{d, i, D, q, v}".

In Claim 8, Column 17, Lines 32 and 33, replace "d+I+D=q+v" with "d+i+D=q+v".

In Claim 14, Column 18, Line 15, replace "{d, I, D, q, v}" with "{d, i, D, q, v}".

In Claim 14, Column 18, Lines 17 and 18, replace "d+I+D=q+v" with "d+i+D=q+v".

Signed and Sealed this
Seventeenth Day of June, 2025

Coke Morgan Stewart
*Acting Director of the United States Patent and Trademark Office*